United States Patent
Upton

Patent Number: 6,067,615
Date of Patent: *May 23, 2000

[54] RECONFIGURABLE PROCESSOR FOR EXECUTING SUCCESSIVE FUNCTION SEQUENCES IN A PROCESSOR OPERATION

[75] Inventor: Eric L. Upton, Redondo Beach, Calif.

[73] Assignee: TRW Inc., Redondo Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/556,438

[22] Filed: Nov. 9, 1995

Related U.S. Application Data

[63] Continuation of application No. 08/159,887, Nov. 30, 1993, abandoned.

[51] Int. Cl.$^7$ .................................................. G06F 15/00
[52] U.S. Cl. .................................................................. 712/37
[58] Field of Search .......................... 395/820, 800.37, 395/500.44; 326/38, 39; 712/37

[56] References Cited

U.S. PATENT DOCUMENTS

| | | | |
|---|---|---|---|
| 4,156,926 | 5/1979 | Hartman | 395/430 |
| 4,434,422 | 2/1984 | Kenol et al. | 342/185 |
| 4,482,953 | 11/1984 | Burke | 395/325 |
| 4,586,157 | 4/1986 | Rector et al. | 711/115 |
| 5,014,193 | 5/1991 | Garner et al. | 395/275 |
| 5,036,473 | 7/1991 | Butts et al. | 364/489 |
| 5,109,503 | 4/1992 | Cruickshank et al. | 395/500 |
| 5,125,081 | 6/1992 | Chiba | 395/325 |
| 5,142,469 | 8/1992 | Weisenborn | 364/146 |
| 5,253,181 | 10/1993 | Marni et al. | 364/489 |
| 5,301,344 | 4/1994 | Kolchinsky | 395/800 |
| 5,349,670 | 9/1994 | Agrawal et al. | 395/775 |
| 5,603,043 | 2/1997 | Taylor et al. | 395/800 |

OTHER PUBLICATIONS

Chappell Brown, "DSP is being reconfigured", Mar. 22, 1993, Technology News, Electronic Engineering Times, p. 22.

Chappell Brown, "The programmable–logic assault", Mar. 15, 1993, Electronic Engineering Times, p. 33, 36.

Hastle et al., "The Implementation of Hardware Subroutines on Field Programmable Gate Arrays," IEEE, 1990, pp. 31.4.1 to 34.4.4.

Athanas, "A Functional . . . Computing," IEEE, Jul. 1993, pp. 49–55.

*Primary Examiner*—John A. Follansbee
*Attorney, Agent, or Firm*—Michael S. Yatsko

[57] ABSTRACT

A digital processor with reconfigurable architecture includes a processor input and a processor output. A library stores a plurality of related function sequences for executing a processor operation. Memory stores data as required by the function sequences. A configurable device is connected to the library and the memory and between the processor input and the processor output. The configurable device sequentially stores the function sequences from the library in a plurality of programmable gate arrays configurable by the function sequences. The configurable device reconfigures the programmable gate arrays with another of the function sequences to complete the processor operation.

17 Claims, 4 Drawing Sheets

RECONFIGURABLE PROCESSOR FOR EXECUTING SUCCESSIVE FUNCTION SEQUENCES IN A PROCESSOR OPERATION

This application is a continuation of U.S. patent application Ser. No. 08/159,887 filed Nov. 30, 1993 now abandoned.

BACKGROUND OF THE INVENTION

1. Technical Field

This invention relates to processors and, more particularly, to reconfigurable processors including programmable logic arrays.

2. Discussion

Conventional microprocessors typically include a central processing unit (CPU), an instruction memory, a data memory, and I/O devices which are interconnected via a high speed bus. The conventional microprocessor operates according to Von Neumann architecture. In other words, the CPU executes a series of instructions, stored in the instruction memory, one at a time using fixed hardware. The interconnecting bus and sequential execution rate-limit the throughput of the Von Neumann architecture microprocessor. The rate limitations can be ameliorated through use of parallel processors at the expense of higher cost and power consumption, lower reliability, and increased difficulty associated with partitioning complex problems.

Therefore, it is desirable to design a processor which increases throughput without increasing cost, power consumption and partitioning complexity, and without decreasing reliability.

SUMMARY OF THE INVENTION

A digital processor with reconfigurable architecture includes a processor input and a processor output. A library stores a plurality of related function sequences for executing a processor operation. Memory stores data as required by the function sequences. A configurable device is connected to the library and the memory and between the processor input and the processor output. The configurable device sequentially stores the function sequences from the library in a plurality of programmable gate arrays configurable by the function sequences. The configurable device stores and retrieves data in the memory during the function sequences. The digital processor reconfigures the programmable gate arrays of the configurable device with another of the function sequences to complete the processor operation.

In yet another feature of the invention, at least one of the function sequences stored in the library includes a plurality of sub-functions. At least one of the sub-functions loads another function sequence from the library into the configurable device.

In yet another feature of the invention, the library includes N PROMs connected to a N to 1 multiplexer. The library further includes a register connected to the configurable device for selecting the PROMs.

In another aspect of the invention, a digital processor with reconfigurable architecture includes a programmable logic array having a processor input, a processor output, a data bus, a data address output, a function sequence input, and a function sequence selection output. The programmable gate array is configurable into a plurality of function sequences. The digital processor includes N PROMs each for storing a function sequence, wherein at least one of the function sequences includes a plurality of sub-functions. The digital processor also includes an N to 1 multiplexer which is connected to the N PROMs and to a register which is connected to the function sequence selection output. The digital processor also includes memory which is connected to the databus and the address bus of the programmable logic array. The memory stores and retrieves data generated by the function sequences during the processor operation. Data initially input to the processor input includes a function sequence selection address which is output at the function sequence selection output by the programmable logic array to the register. The multiplexer connects one of the PROMs corresponding to the function sequence selection address to the function sequence selection input of the programmable logic array to configure the programmable logic array with the function sequence.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DESCRIPTION OF THE PREFERRED EMBODIMENT

Figure 1:
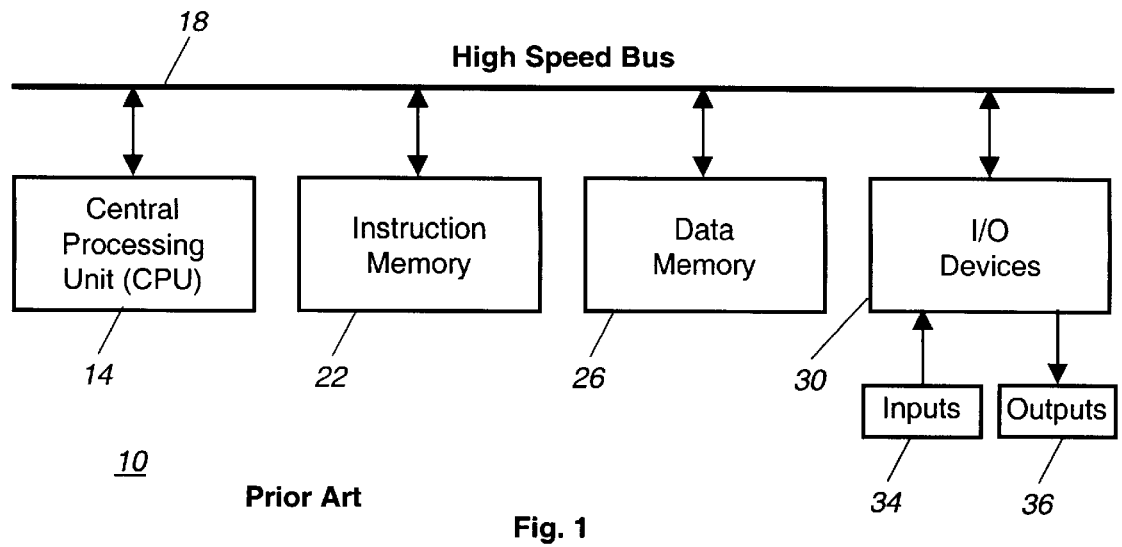
FIG. 1 is a block diagram of a computer processor incorporating prior art Von Neumann architecture.
Figure 2:
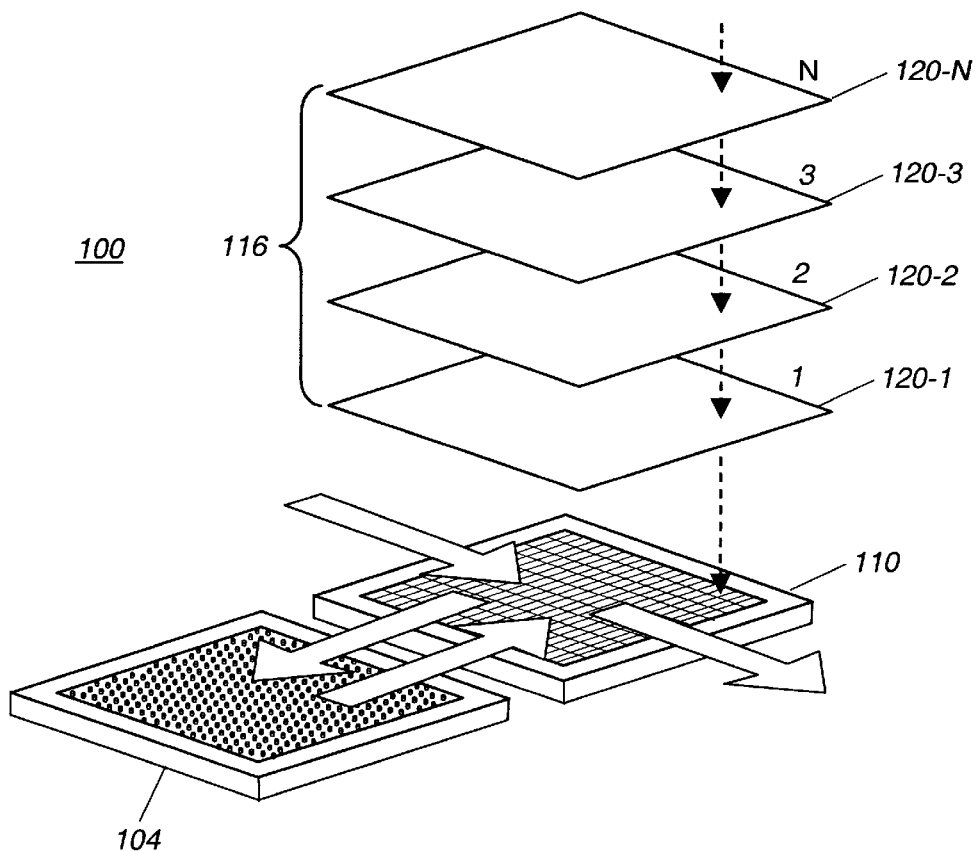
FIG. 2 is a block diagram of a macrologic oriented processor (MOP) according to the present invention.
Figure 3:
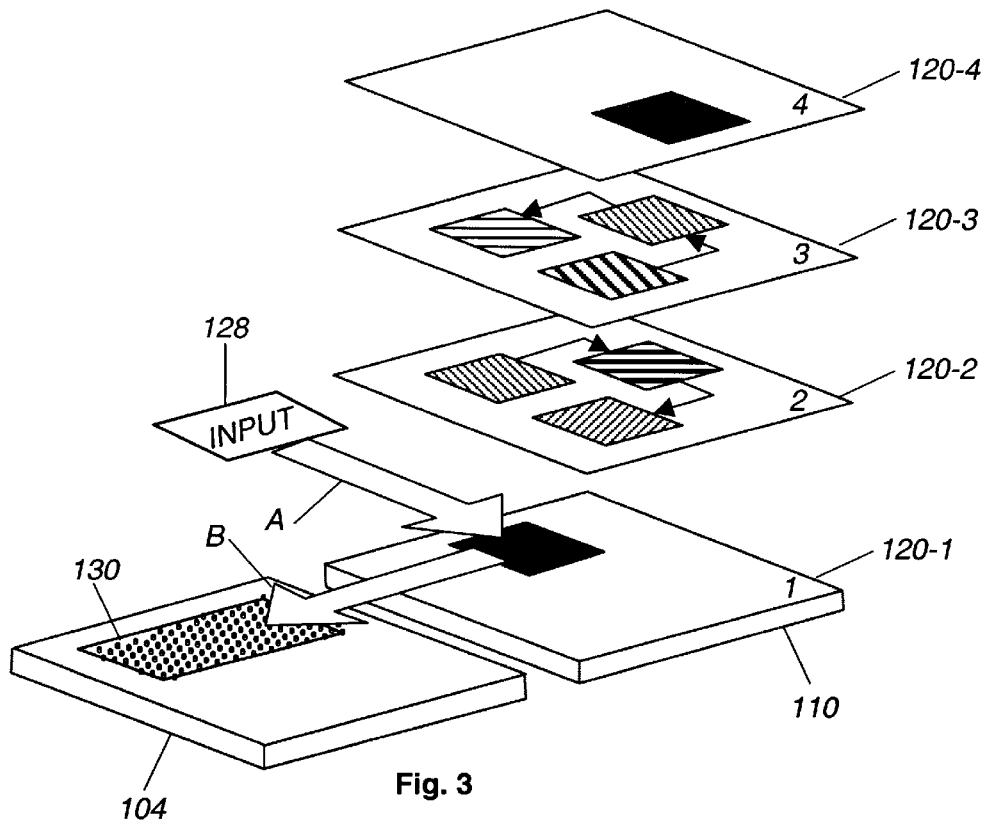
FIG. 3 illustrates a data input function which is the first of four example function sequences for an example MOP operation.
Figure 4:
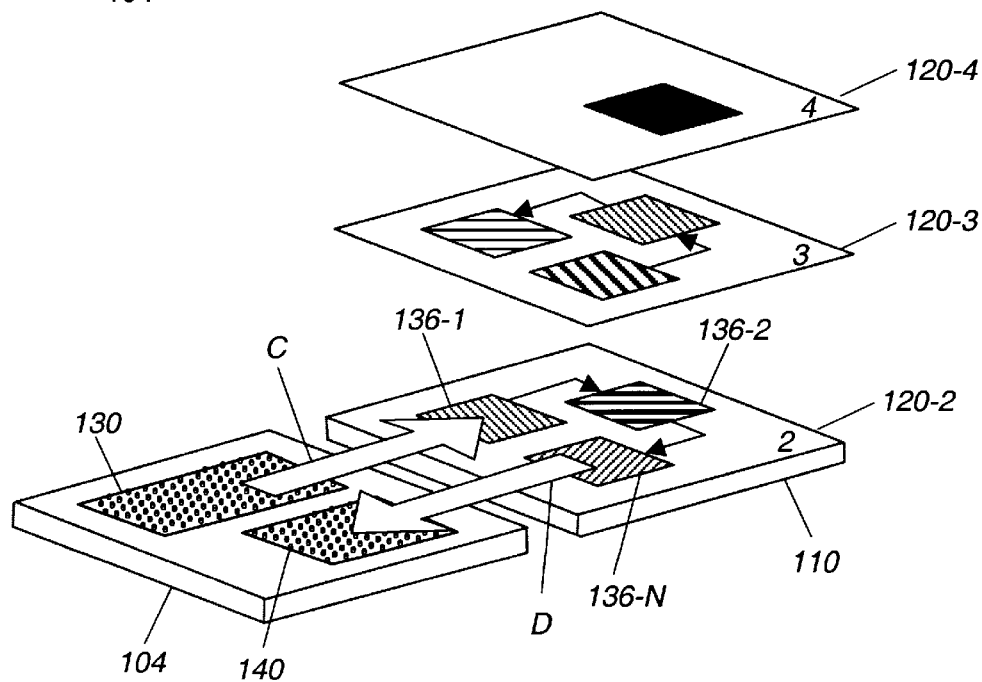
FIG. 4 illustrates a processing function including sourcing data from memory, processing the data, and returning the data to a destination memory and which is the second of four example function sequences for the example MOP operation illustrated in FIG. 3.
Figure 5:
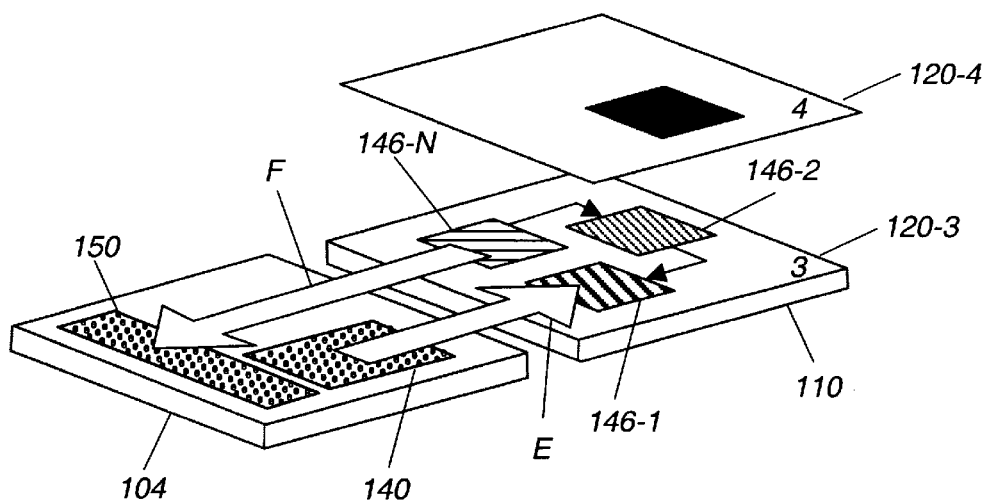
FIG. 5 illustrates a second processing function similar to FIG. 4 and which is the third of four example function sequences for the example MOP operation illustrated in FIG. 3.
Figure 6:
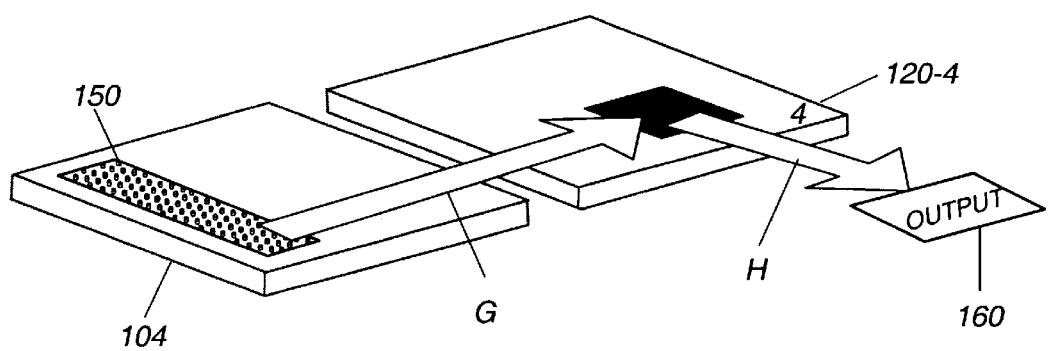
FIG. 6 illustrates an output function which is the fourth of four example function sequences for the example MOP operation illustrated in FIG. 3.

In FIG. 1, a prior art Von Neumann architecture processor 10 includes a central processing unit (CPU) 14 connected via high speed bus 18 to instruction memory 22, data memory 26, and an input/output interface (I/O interface) 30 which can be connected to a plurality of inputs 34 and outputs 36. CPU 14 sequentially executes instructions loaded from instruction memory 22 via high speed bus 18. Depending on the loaded instruction, CPU 14 operates on data input from data memory 26 or I/O interface 32, outputs data to data memory 26, outputs data to I/O interface 32, etc. As can be appreciated, most operations transfer data via high speed bus 18 to and from CPU 14 which rate-limits operation (e.g. the throughput) of microprocessor 10 and drains significant power.

Referring to FIGS. 2–6, a macrologic oriented processor (MOP) 100 according to the present invention includes data memory 104 and a programmable logic array 110 which includes a plurality of reconfigurable gate arrays. Instead of executing an instruction set serially using a fixed hardware set, as described above with the Von Neumann architecture approach, higher throughput is obtainable by using unique hardware structures which can be changed "on the fly" to optimize throughput and processor execution speed. The reconfigurable gate arrays are placed in the data stream to increase speed while allowing significant flexibility for the architecture of the MOP 100.

The architecture of MOP 100 can be interchanged among classical Von Neumann architecture and other architectures such as parallel, systolic, pipeline, etc. very quickly. If desired, MOP 100 can effectively become a parallel processor for one operation, a Von Neumann processor for a second operation, a systolic processor for a third operation, and a pipeline processor for a fourth operation. Other processor architecture combinations would be driven by a particular application and are readily apparent.

A macrologic library stack 116 includes a plurality of related function sequences 120-1, 120-2, ..., 120-N which are an ordered series of arrays which can perform data acquisition or data synthesis, data processing, and data routing to and from destination and source memories. Function sequences 120-1, 120-2, 120-3, ..., 120-N together form a complete processor operation. As can be appreciated, macrologic library stack 116 could include other related function sequences forming other complete processor operations.

FIGS. 2–6 illustrate an example use of MOP 100. In a data input function illustrated in FIG. 3, function sequence 120-1 is loaded into and reconfigures programmable logic array 110. Function sequence 120-1 then sources data from an input device 128 (via Arrow "A") and outputs the data to a first location 130 in data memory 104 (via Arrow "B"). Arrows "A", "B", etc. signify programmable I/O pins and logic of reconfigurable programmable logic array 110 which also form part of the function sequence loaded.

Function sequence 120-2, the second function sequence in the macrologic library stack 116, is loaded into and reconfigures programmable logic array 110. Function sequence 120-2 sources data (via Arrow "C") from the first location 130 in data memory 104 and processes the data using classical Von Neumann, parallel, systolic, and/or pipeline architecture. Function sequence 120-2 can include a plurality of sub-functions 136-1, 136-2, ..., and 136-N executed by reconfigured programmable logic array 110. Sub-function 136-N outputs the data (via Arrow "D") to a second location 140 in memory 104.

Function sequence 120-3, the third function sequence in the macrologic library stack 116, is loaded into and reconfigures programmable logic array 110. Function sequence 120-3 sources data (via Arrow "E") from the second location 140 in data memory 104 and processes the data using classical Von Neumann, parallel, systolic, and/or pipeline architecture. Function sequence 120-3 can include a plurality of sub-functions 146-1, 146-2, ..., and 146-N executed by reconfigured programmable logic array 110. Sub-function 146-N outputs the data (via Arrow "F") to a third location 150 in memory 104.

Additional (N) passes or function sequences can be executed by the MOP 100 if desired. A final example function sequence 120-4 is loaded into and reconfigures programmable logic array 110. The final function sequence 120-4 sources the data from the third location 150 in data memory 104 (via Arrow "G") and outputs the data to an output device 160.

As can be appreciated, while the MOP 100 is illustrated using function sequences 120-1 through 120-4, additional or fewer function sequences can be used. By inserting programmable logic arrays in the data stream, throughput can be increased along with processing flexibility. As a result, a high speed, highly configurable processor is provided.

Figure 7:
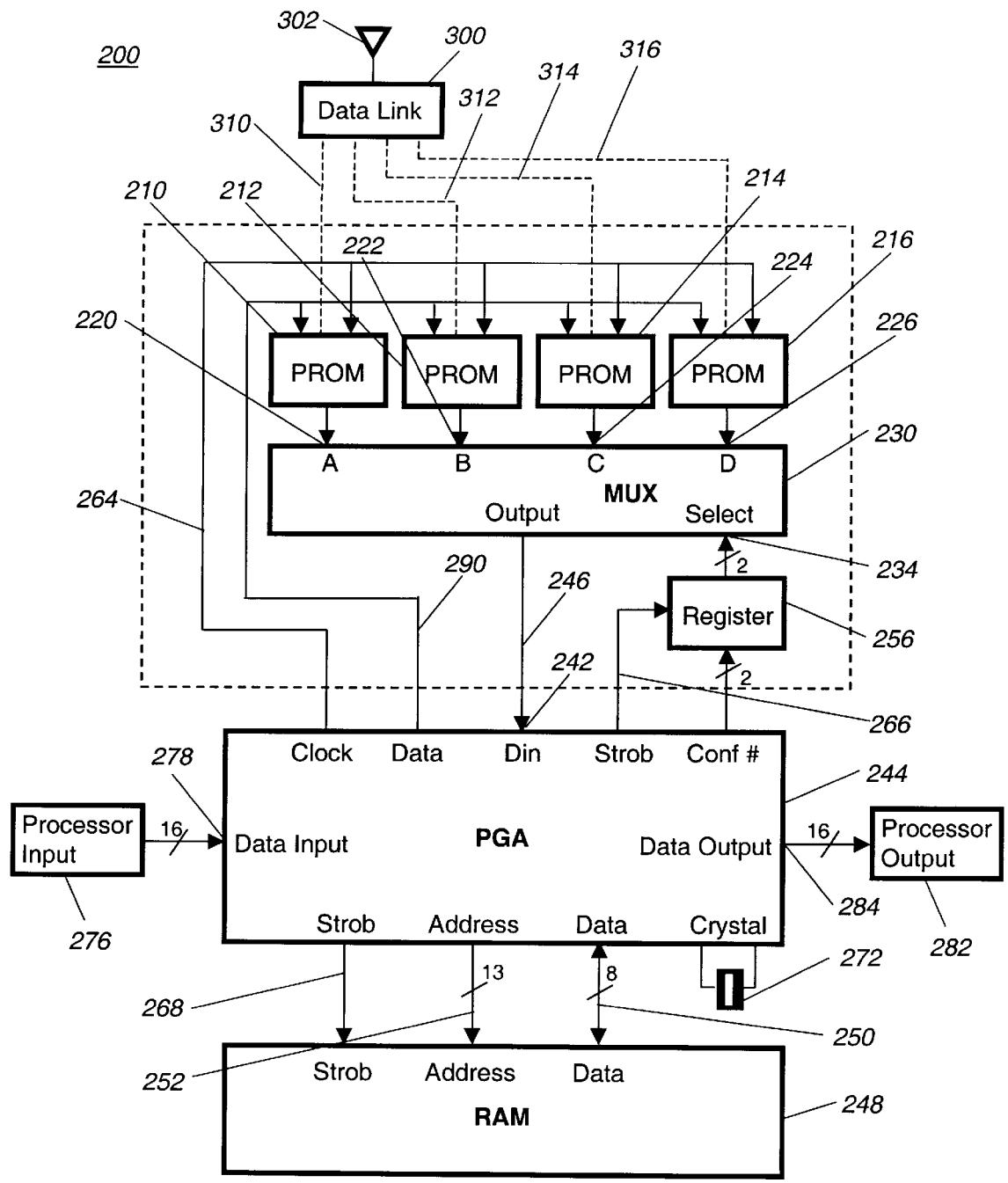
FIG. 7 is an electrical schematic of a preferred embodiment of the MOP.

FIG. 7 illustrates a preferred embodiment of a MOP 200 according to the invention and includes a macro array library 204 with programmable read only memory modules (PROMs) 210, 212, 214 and 216 which store function sequences 120-1 through 120-N, each of which includes configuration data. PROMs 210, 212, 214 and 216 are connected to inputs 220, 222, 224 and 226 of a multiplexer (MUX) 230 which is addressed via a select input 234.

An output 238 of MUX 230 is connected to an input 242 of a programmable gate array (PGA) (also called reconfigurable gate array) 244 via connector 246. PGA 244 can access and store data in random access memory (RAM) 248 via data and address connections 250 and 252. As can be appreciated, dynamic and random access memory can be used. Other types of memory will be readily apparent. PGA 244 selects desired configuration data located in the PROMs using register 256. PGA 244 can also provide timing for the PROMS, register 256, and RAM 248 via connectors 264, 266 and 268, respectively. A crystal 272 is connected to a crystal oscillator circuit (not shown, internal to PGA 244) which provides timing for MOP 100. A processor input 276 is connected to a data input 278 of PGA 244 and a processor output 282 is connected to a data output 284 of PGA 244.

PROMs 210, 212, 214, and 216 can be type XC17650 sold by Xilinx. PGA 244 can be type XC3090 sold by Xilinx. SRAM 248 can be type MCM 6264-35 sold by Motorola. MUX 230 can be a 4 to 1 multiplexer, for example type MC74F153 sold by Motorola. Register 256 can be a two bit register, for example type MC74F74 sold by Motorola. Crystal 272 can be a 16 Mhz crystal, for example type MP 136-12-01 sold by M-Tron.

A data link device 300 and an antenna 302 can be connected to macro array library 204 for remote reconfiguring of PROMs 210, 212, 214, and 216 which can be connected to data link device 300 by dotted lines 310, 312, 314 and 316, respectively. Data link device 300 could include internal or external memory and a microprocessor if desired. Data link device 300 could be implemented using conventional software executed by the microprocessor and memory or alternately data link device could be hard wired. Data link device 300 could also be connected directly to PGA 244. Other configurations and connections will be readily apparent. Data link device 300 could be used to reconfigure and/or reprogram PGA 244 remotely, for example, if MOP 200 is used in satellite applications.

In use, data is initially input into PGA 244 and includes address data identifying a first function sequence to be performed. PGA 244 interprets the data and loads a first configuration, providing the desired first function sequence, from a PROM, for example PROM 210, by selecting the PROM using register 256 and MUX 230 and by enabling the PROM via connector 290. Once loaded, PGA 244 disables the PROM and performs functions defined by the first function sequence loaded in PGA 244. The first function sequence can generate a final instruction (e.g. address data for a second function sequence) to reprogram PGA 244 for the second function sequence. Additional function sequences can be programmed and performed by PGA 244 as desired.

As can be appreciated, MOP 100 according to the invention ameliorates rate limitations of conventional Von Neumann processors by reconfiguring a programmable logic gate array as a series of programmable hardware processors. As a result higher costs and power consumption, lower reliability, and increased difficulty of partitioning complex problems can be avoided. The processor architecture of MOP 100 can be changed as desired to provide a most effective processor architecture for a given problem. Other advantantages will be readily apparent.

The various advantages of the present invention will become apparent to those skilled in the art after a study of the foregoing specification and following claims.

What is claimed is:

1. A digital processor with reconfigurable architecture comprising:

a processor input;

a processor output;

library means for storing a plurality of function sequences;

memory means for storing data; and configurable means, connected to said library means, and said memory means and between said processor input and said processor output, for executing a processor operation, including first, second and third function sequences, by sequentially loading said first function sequence from said library means into a programmable gate array configurable by said first function sequence, said first function sequence generating a data result wherein said configurable means thereafter reconfigures said programmable gate array, means for replacing said first function sequence by selectively choosing between said second and said third function sequence from said library means during the processor operation based upon said generated data result, said programmable gate array being reconfigured with said chosen function sequence so as to contain one and only one functional sequence from said library means, wherein said configurable means stores and retrieves data from said memory means during at least one of said function sequences during said processor operation, and wherein said first function sequence includes a plurality of sub-functions, and at least one of said sub-functions loads either said second or said third function sequence from said library means based upon said generated data result into said configurable means to reconfigure said programmable gate array, said memory means being external to said programmable gate array so that said generated data result is stored in said external memory means while said programmable gate array is being fully reconfigured with said one and only one functional sequence, said memory means being connected to said library means and to said configurable means.

2. The digital processor of claim 1 wherein said library means includes N PROMs connected to a N to 1 multiplexer.

3. The digital processor of claim 2 wherein said library means further includes a register connected to said configurable means for selecting said PROMs.

4. The digital processor of claim 1 wherein said library means includes a data link means for receiving new function sequences transmitted from locations remote from said digital processor, wherein said new function sequences are used to reconfigure said architecture of said digital processor.

5. A digital processor with reconfigurable architecture comprising:

a processor input;

a processor output;

library means for storing a plurality of function sequences;

memory means for storing data; and configurable means, including a programmable gate array and connected to said memory means, and said memory means and between said processor input and said processor output, for executing a processor operation including first and second function sequences and for storing said first function sequence from said library means in said programmable gate array configurable by said first function sequence and thereafter reconfiguring said programmable gate array, means for replacing said first function sequence with said second function sequence based upon data generated by said first function sequence, said programmable gate array being reconfigured with said second function sequence so as to contain one and only one functional sequence from said library means, wherein said configurable means stores and retrieves data from said memory means during said processor operation as required by said function sequences, and wherein said first function sequence includes a plurality of sub-functions, and wherein at least one of said sub-functions loads said second sequence from said library means into said configurable means to reconfigure said programmable gate array based upon data generated by said first function sequence, said memory means being external to said programmable gate array so that said generated data is stored in said external memory means while said programmable gate array is being fully reconfigured with said one and only one functional sequence, said memory means being connected to said library means and to said configurable means, said memory means being in data communication with said library means while said programmable gate array is being fully reconfigured with said one and only one functional sequence.

6. The digital processor of claim 5 wherein said library means includes N PROMs connected to a N to 1 multiplexer.

7. The digital processor of claim 6 wherein said library means further includes a register connected to said configurable means for selecting said PROMs.

8. A digital processor with reconfigurable architecture comprising:

a processor input;

a processor output;

library means, including N PROMs connected to a N to 1 multiplexer, for storing a plurality of function sequences;

memory means for storing data as required by said function sequences; and configurable means, connected to said storing means, and said memory means and between said processor input and said processor output, for executing a processor operation including first and second function sequences and for storing said first function sequence in a programmable gate array configurable by said first function sequence and thereafter reconfiguring said programmable gate array means for replacing said first function sequence with said second function sequence based upon data generated by said first function sequence, said programmable gate array being reconfigured with said second function sequence so as to only contain said second function sequence, wherein said configurable means stores and retrieves data from said memory means during said processor operation, wherein said first function sequence includes a plurality of sub-functions, and wherein at least one of said sub-functions loads said second function sequence from said library means into said programmable gate array of said configurable means to reconfigure said programmable gate array based upon data generated by said first function sequence, said memory means being external to said programmable gate array so that said generated data is stored in said external memory means while said programmable gate array is being fully reconfigured with only said second function sequence, said memory means being connected to said library means and to said configurable means.

9. A digital processor with reconfigurable architecture for executing a processor operation including a plurality of function sequences comprising:

a programmable logic array having a processor input, a processor output, a data bus, a data address output, a function sequence input, and a function sequence selection output, wherein said programmable logic array is configurable into a plurality of function sequences;

N PROMs each for storing a function sequence, wherein at least one of said function sequences includes a plurality of sub-functions;

an N to 1 multiplexer, connected to said N PROMs and to a register which is connected to said function sequence selection output; and memory means, connected to the data bus and said address bus of said programmable logic array, for storing and retrieving data generated by said function sequences during at least one function sequence in said processor operation including said plurality of function sequences, wherein data initially input to said processor input includes a function sequence selection address which is output at said function sequence selection output by said programmable gate logic array to said register, and wherein said multiplexer connects one of said PROMs corresponding to said function sequence selection address to said function sequence selection input of said programmable logic array to configure said programmable logic array with said function sequence which generates a data result and wherein one of said plurality of sub-functions stored in said programmable logic array loads a subsequent function sequence from one of said N PROMs into said programmable logic array to reconfigure said programmable logic array based upon said generated data result, said programmable logic array being reconfigured so as to replace a functional sequence with another functional sequence from one of said PROMs, said programmable logic array containing one and only one functional sequence from said PROMs, said memory means being external to said programmable logic array so that said generated data result is stored in said external memory means while said programmable logic array is being fully reconfigured with said one and only one functional sequence, said memory means being connected to said multiplexer and to said programmable logic array.

10. A digital processor with reconfigurable architecture comprising:

a library for storing a first, second, and third function sequence;

memory means for storing data as required by said first, second, and third function sequences; and a reconfigurable programmable logic array connected to said library, said programmable logic array being loaded with said first function sequence from said library to reconfigure said programmable logic array, said reconfigured programmable logic array performing a processor operation which generates a data result, said programmable logic array selecting either said second or said third function sequence from said library based upon said generated data result, said selected function sequence reconfiguring said programmable logic array, said reconfigured programmable logic array containing one and only one function sequence from said library, said memory means being external to said programmable logic array so that said generated data is stored in said external memory means while said programmable logic array is being fully reconfigured with said one and only one function sequence, said memory means being connected to said library and to said programmable logic array.

11. The digital processor of claim 10 wherein said first function sequence includes selection criteria for selecting a subsequent function sequence from said library in order to reconfigure said programmable logic array based upon said selected subsequent function sequence, said selection criteria being evaluated based upon said generated data result.

12. The digital processor of claim 10 further comprising:

a data memory being directly coupled to said programmable logic array for storing data produced during said processor operation.

13. The digital processor of claim 10, wherein each of said function sequences are identified by an identifier, said digital processor further comprising:

a register being connected to said library and to said programmable logic array, said programmable logic array storing in said register the identifier of said selected subsequent function sequence, said subsequent function sequence being selected based upon the identifier stored in said register.

14. A method for reconfiguring a digital processor, said digital processor having a library, a memory, and a reconfigurable programmable logic array, said library storing a first, second, and third function sequence, said programmable logic array performing processor operations based upon a function sequence from said library, comprising the steps of:

reconfiguring said programmable logic array based upon said first function sequence from said library in order to perform a first processor operation, said first processor operation generating a data result;

selecting either said second or said third function sequence from said library based upon said generated data result;

reconfiguring said programmable logic array based upon said selected function sequence in order to perform a second processor operation, said reconfigured programmable logic array containing one and only one function sequence; and storing said generated data result in said memory while said programmable logic array is being reconfigured with said one and only one function sequence, said memory being external to said reconfigurable programmable logic array, said memory means being connected to said library and to said programmable logic array.

15. The method of claim 14 further comprising the step of:

selecting a second function sequence from said library based upon a selection criteria contained in said first function sequence, said selection criteria being evaluated based upon said generated data result.

16. The method of claim 14 further comprising the step of:

storing data produced during said first and second processor operations in a data memory, said data memory being directly coupled to said programmable logic array.

17. The method of claim 14 wherein each of said function sequences are identified by an identifier and wherein said programmable logic array stores in a register the identifier of said second function sequence, said register being connected to said library and to said programmable logic array.

* * * * *